(12) United States Patent
Walter

(10) Patent No.: US 10,167,936 B2
(45) Date of Patent: Jan. 1, 2019

(54) CVT TRANSMISSION

(71) Applicant: SCHAEFFLER TECHNOLOGIES AG & CO. KG, Herzogenaurach (DE)

(72) Inventor: Bernhard Walter, Oberkirch-Haslach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 267 days.

(21) Appl. No.: 15/103,258

(22) PCT Filed: Nov. 28, 2014

(86) PCT No.: PCT/DE2014/200661
§ 371 (c)(1),
(2) Date: Jun. 9, 2016

(87) PCT Pub. No.: WO2015/086015
PCT Pub. Date: Jun. 18, 2015

(65) Prior Publication Data
US 2016/0305521 A1 Oct. 20, 2016

(30) Foreign Application Priority Data
Dec. 9, 2013 (DE) .......... 10 2013 225 264

(51) Int. Cl.
*F16H 61/02* (2006.01)
*F16H 37/02* (2006.01)
(Continued)

(52) U.S. Cl.
CPC ......... *F16H 37/022* (2013.01); *F16H 37/082* (2013.01); *F16H 61/0265* (2013.01);
(Continued)

(58) Field of Classification Search
None
See application file for complete search history.

(56) References Cited

U.S. PATENT DOCUMENTS 5,890,987 A * 4/1999 Lamers ............... F16H 37/022
474/28
5,967,931 A * 10/1999 Hoge .................. B60K 17/348
180/247
(Continued)

FOREIGN PATENT DOCUMENTS

CN 101228370 A 7/2008
CN 102128244 A 7/2011
(Continued)

OTHER PUBLICATIONS

Chinese Office Action from 201480066804.X; 7 pgs; dated Oct. 10, 2017 by the Chinese Patent Office.

*Primary Examiner* — Justin Holmes
(74) *Attorney, Agent, or Firm* — LeKeisha M. Suggs

(57) ABSTRACT

A CVT transmission including a start-up element, a variator, and a direct-shift stage for switching between a first operating range (low) and a second operating range (high). A maximum transmission ratio of the second operating range (high) corresponds to a minimum transmission ratio of the first operating range (low). The transmission ratio ranges are arranged so that the marginal variator transmission ratio ranges, which constitute low-efficiency ranges, are not used.

9 Claims, 2 Drawing Sheets

(51) Int. Cl.
   *F16H 37/08*    (2006.01)
   *F16H 61/662*   (2006.01)
   *F16H 3/54*     (2006.01)

(52) U.S. Cl.
   CPC ............ *F16H 61/662* (2013.01); *F16H 3/54* (2013.01); *F16H 2037/023* (2013.01); *F16H 2037/025* (2013.01); *F16H 2200/0008* (2013.01); *F16H 2200/0034* (2013.01); *F16H 2200/2005* (2013.01); *F16H 2200/2038* (2013.01)

(56) References Cited

U.S. PATENT DOCUMENTS

| | | | | |
|---|---|---|---|---|
| 6,244,368 B1 * | 6/2001 | Ando | ...................... | B60K 6/48 180/65.25 |
| 6,979,275 B2 * | 12/2005 | Hiraku | ...................... | F16H 3/54 475/214 |
| 7,347,801 B2 * | 3/2008 | Guenter | ................ | F16H 37/086 475/216 |
| 2011/0172051 A1 | 7/2011 | Hoffman | | |
| 2014/0315676 A1 * | 10/2014 | Janson | ................... | F16H 37/022 475/212 |
| 2015/0337931 A1 | 11/2015 | Walter | | |

FOREIGN PATENT DOCUMENTS

| | | |
|---|---|---|
| DE | 102 61 990 A1 | 2/2004 |
| DE | 10 2011 008 365 A1 | 7/2011 |
| EP | 2 275 709 A1 | 1/2011 |
| EP | 2668420 A1 | 12/2013 |
| WO | 2013120655 | 8/2013 |
| WO | WO 2013/120655 A1 | 8/2013 |
| WO | WO 2014/094771 A1 | 6/2014 |

\* cited by examiner

CVT TRANSMISSION

CROSS-REFERENCE TO RELATED APPLICATION

This application is the U.S. national phase application under 35 U.S.C. § 371 of International Application Serial No. PCT/DE2014/200661, having an international filing date of 28 Nov. 2014, and designating the United States, which claims priority based upon German Patent Application No. DE 10 2013 225 264.1, filed on 9 Dec. 2013, the entire contents of each of which applications are hereby incorporated by reference herein to the same extent as if fully rewritten.

BACKGROUND OF THE INVENTION

Field of the Invention

The present invention relates to a CVT transmission having a start-up element, a variator, and having a direct-shift stage for switching between the first operating range (low) and a second operating range (high). In addition, the present invention relates to a method for operating such a CVT transmission.

Description of the Related Art

The term CVT refers to a stepless transmission; the letters CVT stand for continuously variable transmission. To increase the transmission ratio range of a stepless transmission—its gear ratio spread-it is known from European published unexamined application EP 2 275 709 A1 to position a planetary gear set after the stepless transmission. The controllable planetary gear set enables two-range shifting and shifting into reverse. In addition, it is known from German published application DE 102 61 990 A1 to provide a multi-range CVT with fixed engageable gears, for example for moving off or for top speed; however, when these fixed transmission ratios are in operation the variator is uncoupled. Consequently, there is only one stepless range; stepless operation is not possible in all driving ranges.

An object of the present invention is to simplify the operation of a CVT transmission having a start-up element, a variator, and having a direct-shift stage for switching between a first operating range (low) and a second operating range (high).

SUMMARY OF THE INVENTION

The above-identified object is fulfilled in the case of a CVT transmission having a start-up element, a variator, and having a direct-shift stage for switching between a first operating range (low) and a second operating range (high), by letting a maximum transmission ratio of the second operating range (high) correspond to a minimum transmission ratio of the first operating range (low). With conventional dual-range CVT transmissions, a relatively large overlap of the two transmission ratio ranges is necessary to enable convenient implementation of switching between ranges. However, such a large range overlap is achieved at the expense of an efficiency-optimized variator ratio spread in variator operation. By synchronizing the maximum transmission ratio of the second operating range with the minimum transmission ratio of the first operating range according to the present invention, it is possible to improve the efficiency of the CVT transmission having the direct-shift stage.

The object stated above is fulfilled alternatively or additionally in the case of a CVT transmission having a start-up element, a variator, and having a direct-shift stage for switching between a first operating range (low) and a second operating range (high), by letting a minimum variator ratio of the second operating range (high) be greater than a minimum variator ratio of the first operating range (low). According to one aspect of the invention, the transmission ratio ranges are designed so that the marginal variator ranges, which constitute low-efficiency ranges, are not used. According to another aspect of the invention, the marginal variator range of the second operating range (high) is reduced more severely than the marginal variator range of the first operating range (low). In so doing, consideration is given to the fact that the second operating range (high) is normally used for a larger proportion of the running time than the first operating range (low).

The object stated above is fulfilled alternatively or additionally in the case of a CVT transmission having a start-up element, a variator, and having a direct-shift stage for switching between a first operating range (low) and a second operating range (high), by letting a closing valve device be operatively connected to a variator fluid system in such a way that the variator fluid system is closed fluid-tight by the closing valve device when the direct-shift stage is used for driving with the variator uncoupled. That protects the variator, in particular the variator fluid system, in a simple manner against running empty. The present invention can also relate to a variator fluid system having such a closing valve device. The closing valve device preferably includes a valve that has no or almost no leakage, for example a seated valve.

The object stated above is fulfilled alternatively or additionally in the case of a CVT transmission having a start-up element, a variator, and having a direct-shift stage for switching between a first operating range (low) and a second operating range (high), by letting a clutch of the direct-shift stage, in particular a jaw clutch, be designed as a normally open clutch. That makes it possible to realize in a simple way a safety function against drive train locking in the event of a system error. To achieve the safety function, the jaw clutch of the direct-shift stage can be designed, for example, as a normally open clutch. Alternatively or additionally, a start-up clutch can be used as a control element against drive train locking when switching to the direct-shift stage, in particular at a time when the variator and the direct-shift stage are included in the power flow simultaneously.

Another preferred exemplary embodiment of the CVT transmission is characterized in that the direct-shift stage which bridges the variator is tied directly to the drive. The direct connection of the direct-shift stage to the drive enables the direct-shift stage to be used advantageously independently of the start-up element. The direct-shaft stage can be connected, for example, to a gear that is used in conventional CVT drive trains to drive a hydraulic pump. Such a gear is therefore also referred to as a pump gear. If the input drive includes a combustion machine or internal combustion engine, then the direct-shift stage that bridges the variator is driven directly by the combustion machine or internal combustion engine. Because of the direct connection of the direct-shift stage to the input drive, the direct-shaft stage is preferably used within the framework of the present invention exclusively in the driving operation of a motor vehicle equipped with the CVT drive train.

Another preferred exemplary embodiment of the CVT transmission is characterized in that the direct-shift stage that bridges the variator is connected to a crankshaft with a torsional vibration damper interposed. A torque of the input drive, in particular of the combustion machine or internal combustion engine, is delivered by means of the crankshaft. The torsional vibration damper serves to uncouple unwanted torsional vibrations which occur during operation of the input drive, in particular the combustion machine or internal combustion engine, from the CVT drive train. That prevents unwanted damage to the CVT drive train caused by rotational non-uniformities.

Another preferred exemplary embodiment of the CVT transmission is characterized in that a sub-transmission is positioned between the variator and the differential. The sub-transmission is, for example, a step-down gear. The sub-transmission is preferably positioned between the variator output and the differential. The direct-shift stage, on the other hand, is preferably positioned between the start-up element and the variator input.

Another preferred exemplary embodiment of the CVT transmission is characterized in that the sub-transmission is implemented as a dual-range transmission, in particular as a planetary transmission. The dual-range transmission makes driving operation possible, for example, in the first range, which is also referred to as the low range, and in the second range, which is also referred to as the high range. In the first range, it is possible, for example, to drive with a higher transmission ratio than in the second range. Furthermore, the dual-range transmission in the form of a planetary transmission advantageously make it possible to produce a reverse gear.

In a method for operating a CVT transmission having a start-up element, a variator, and having a direct-shift stage for switching between a first operating range (low) and a second operating range (high), in particular a CVT transmission described earlier, the object stated above is fulfilled alternatively or additionally by the fact that marginal variator ranges of the operating ranges (low and high) are not used. The efficiency of the CVT transmission is poorer in the marginal variator ranges. The efficiency of the CVT transmission can be improved in a simple way by not using the marginal variator ranges. The marginal variator ranges, which are not used according to the method according to the invention, are preferably lower end regions of transmission ratio characteristics, which serve to depict the two operating ranges low and high in a transmission ratio characteristic map. In such a transmission ratio characteristic map, the variator ratio is plotted, for example, on an x-axis. The transmission ratio is then plotted advantageously on the y-axis of the transmission ratio characteristic map.

The object stated above is fulfilled alternatively or additionally in a method for operating a CVT transmission having a start-up element, a variator, and having a direct-shift stage for switching between a first operating range (low) and a second operating range (high), in particular a CVT transmission described earlier, in particular in a method described earlier, by the fact that in a quick reset of the transmission ratio the system jumps directly from one operating range into the other operating range, without using the direct-shift stage and without resetting completely steplessly. That makes it possible to improve the driving comfort during operation of the CVT transmission.

The object stated above is fulfilled alternatively or additionally in a method described above by letting the start-up element, in particular a starting clutch, be used as a control element against drive train locking when switching to the direct-shift stage. In that case, the start-up element, in particular the starting clutch, is used in particular at a time when the variator and the direct-shift stage are included in the power stream simultaneously.

The object stated above is fulfilled alternatively or additionally in a method described above by letting the start-up element, in particular a starting clutch, be used in a slipping mode, in order to accelerate the stationary variator before the direct-shift stage is uncoupled and the power stream is again routed to the variator. That makes it possible to further improve the driving comfort of the CVT transmission.

BRIEF DESCRIPTION OF THE DRAWINGS

Additional advantages, features, and details of the present invention can be seen from the following description, in which various exemplary embodiments are described in detail with reference to the drawings. The drawing figures show the following.

DESCRIPTION OF THE PREFERRED EMBODIMENTS

Figure 1:
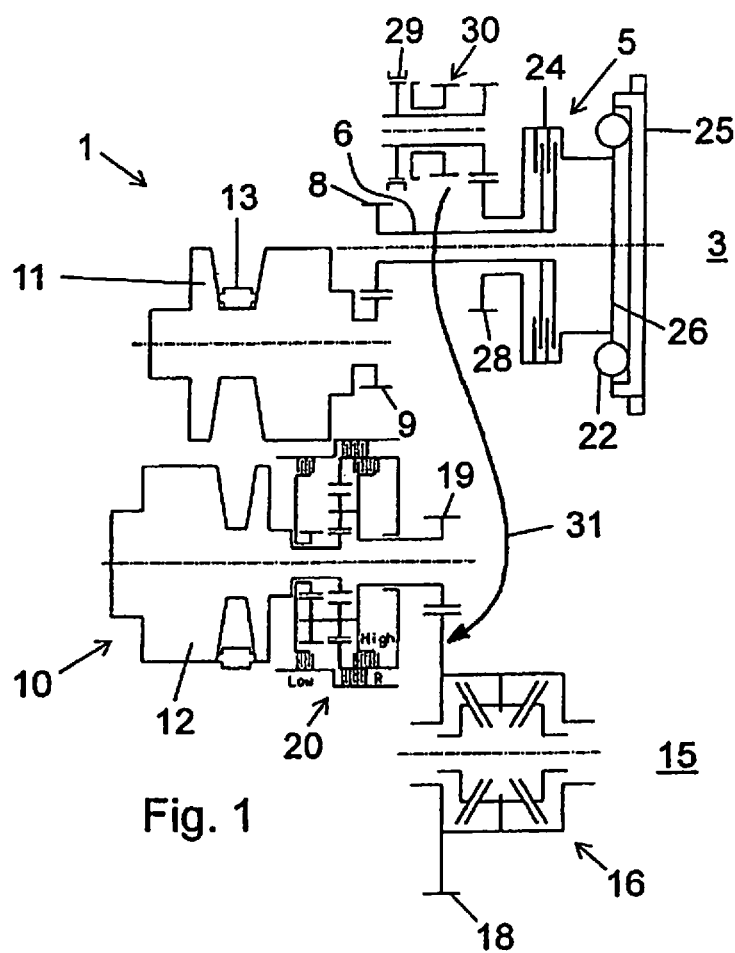
FIG. 1 is a simplified representation of a CVT drive train according to the present invention in a longitudinal section.
Figure 2:
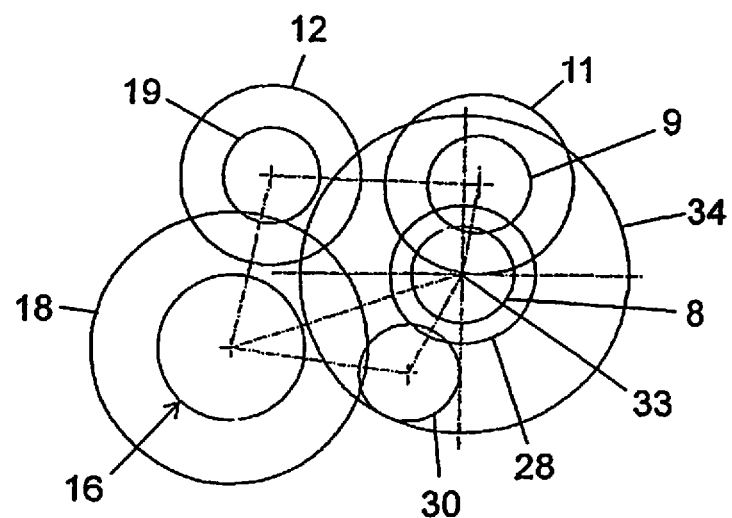
FIG. 2 shows the CVT drive train of FIG. 1 in cross section.

FIGS. 1 and 2 show different views of a simplified representation of a CVT drive train 1 according to the present invention. The CVT drive train 1 includes an input drive 3. The input drive is, for example, a combustion machine, which is also referred to as an internal combustion engine when used in a motor vehicle. The CVT drive train 1 is used in motor vehicles.

A start-up element 5 makes it possible to move the motor vehicle off. A torque is transmitted from the input drive 3 to a start-up output part 6 through the start-up element 5. The start-up output part 6 is connected to a variator input of a variator 10 through a gear stage having a gear 8 and a gear 9.

The variator 10 includes a conical disk set 11 on the drive side and a conical disk set 12 on the output side. The two conical disk sets 11, 12 are coupled with each other by an endless torque-transmitting means 13, which is only shown generally. The endless torque-transmitting means 13 can be, for example, a special chain.

By means of the two conical disk sets 11 and 12, the transmission ratio between the input drive 3 and an output 15 can be varied continuously. The output 15 includes at least one driven wheel (not shown).

Normally, the output 15 is operatively connected to at least two driven vehicle wheels. An equalizing transmission, also referred to as a differential 16, serves to distribute the provided torque to the two driven vehicle wheels. The differential 16 includes a spur gear 18.

The spur gear 18 of the differential 16 meshes with a sub-transmission output gear 19 of a sub-transmission 20. The sub-transmission 20 is assigned to a variator output on the output-side conical disk set 12.

A torsional vibration damper 22 is operatively connected with the input drive 3 of the CVT drive train 1. The torsional vibration damper 22 is positioned between the input drive 3 and the start-up element 5. The start-up element 5 is implemented as a starting clutch 24. The starting clutch 24 is a wet-running multi-plate clutch.

An input part 25 of the torsional vibration damper 22 is non-rotatably connected to a crankshaft of the input drive 3.

An output part 26 of the torsional vibration damper 22 represents, on the one hand, an input of the starting clutch 24. On the other hand, the output part 26 of the torsional vibration damper 22 is non-rotatably connected to a gear 28. The gear 28 serves, for example, to drive a pump (not shown). The gear 28 is therefore also referred to as a pump gear. However, the gear 28 can also serve to drive a different or an additional vehicle component.

According to one aspect of the present invention, a direct-shift stage 30 that is switchable with the aid of a switching device 29 is operatively connected to the gear 28. An arrow 31 indicates that the direct-shift stage 30 serves to bridge the variator 10. As indicated by the arrow 31, with the aid of the switching device 29, the direct-shift stage 30 can provide a direct coupling of the gear 28 to the spur gear 18 of the differential 16. With the aid of the direct-shift stage 30, the input drive 3 can be connected as a drive through the torsional vibration damper 22 to the output drive 15, independently of the start-up element 5, past the variator 10, to the differential 16.

In FIG. 2, the axis of rotation 33 of the crankshaft runs perpendicular to the plane of the drawing. A circle 34 indicates a starter ring gear which is non-rotatably connected to the crankshaft. A radially inner circle represents the gear 8 shown in FIG. 1. Another circle represents the gear 28, also referred to as a pump gear. Gear 8 meshes with gear 9, which represents the variator input. Gear 9 is operatively connected to the drive-side conical disk set 11, which is likewise represented in FIG. 2 as a circle. A circle 12 represents the output-side conical disk set. The sub-transmission gear 19 meshes with the spur gear 18, which is likewise indicated by a circle.

The circles in FIG. 2 make the front-transverse construction clear. In FIG. 2, the direct-shift stage is positioned below the axis 33 of the crankshaft and in the direction of the spur gear 18 of the differential 16. Front-transverse construction means that the input drive 3, in particular the internal combustion engine, and the transmission, here the variator 10 and the sub-transmission 20, are positioned next to each other in the transverse direction of the vehicle, for example in front of or above a front axle.

In FIGS. 1 and 2, the sub-transmission 20 is implemented as a planetary transmission having two planetary gear sets and two plate assemblies. The sub-transmission 20 in the form of a planetary transmission makes it possible to switch between a first range low and a second range high. Furthermore, the sub-transmission 20 serves to provide a reverse gear R.

Figure 3:
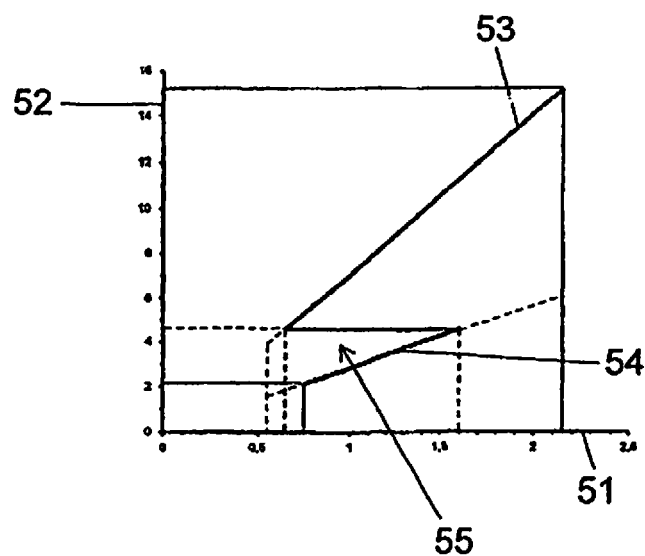
FIG. 3 is a transmission ratio characteristic map of the CVT drive train shown in FIGS. 1 and 2 according to a first exemplary embodiment of a method according to the invention.

FIG. 3 shows a transmission ratio characteristic map for the CVT drive train 1 shown in FIGS. 1 and 2. The transmission ratio characteristic map is designed as a Cartesian coordinate diagram having an x-axis 51 and a y-axis 52. A variator transmission ratio is plotted on the x-axis 51. A sub-transmission transmission ratio is plotted on the y-axis 52.

An upper characteristic curve 53 serves to represent the first operating range, which is also referred to as the low range. A lower characteristic curve 54 serves to represent the second operating range, which is also referred to as the high range. The low range 53 begins at a variator transmission ratio of about 0.65 and a sub-transmission ratio of about 4.7. The high range begins at a variator transmission ratio of about 0.57 and a sub-transmission ratio of about 2.1.

A line 55 running parallel to the x-axis 51 indicates that the direct-shift stage, which is also referred to as the constant stage, is used to switch between the ranges 53 and 54 while the sub-transmission ratio is always the same. In FIG. 2, the sub-transmission ratio of about 4.6 is used, which exists at the lower end of the characteristic curve 53 and at the upper end of the characteristic curve 54. Thus, the line 55 connects the upper end of characteristic curve 54 with the lower end of characteristic curve 53. That enables the available variator transmission ratio spread to be utilized optimally.

Dashed lines at the beginning and the lower ends of characteristic curves 53 and 54 indicate that the transmission ratio ranges are laid out according to one aspect of the invention so that the marginal variator transmission ratio ranges at the lower ends of characteristic curves 53 and 54 are not used. Here, the transmission ratios are laid out according to another aspect so that in the case of the second operating range or transmission ratio range, which is also referred to as the high range, the marginal range at the lower end of characteristic curve 54 is reduced more severely than the marginal range at the lower end of characteristic curve 53.

According to another aspect of the invention, when driving in the direct-shift stage 30 and with uncoupled, non-rotating variator 10, a valve switching system is provided to protect the variator 10 or a variator fluid system against running empty. The valve switching system preferably includes a valve that has no or almost no leakage.

According to another aspect of the invention, when a quick reset is desired by a driver of a motor vehicle equipped with the CVT drive train, the system jumps directly from one range into the other range, without using the direct-shift stage and without resetting completely steplessly.

According to another aspect of the invention, the switching device 29 of the direct-shift stage 30 is designed as a claw clutch. This claw clutch is equipped with a normally-open function to represent a safety function against drive train locking in the event of a system error. Normally open means that the claw clutch is normally disengaged, and is closed or engaged actively.

According to another aspect of the invention, the start-up element 5, in particular the starting clutch 24, is used as a control element against drive train locking when switching to the direct-shift stage 30, namely in particular at a time when the variator 10 and the direct-shift stage 30 are included in the power stream simultaneously.

According to another aspect of the invention, the start-up element 5, in particular the starting clutch 24, is used in a slipping mode, in order to accelerate the stationary variator 10 before the direct-shift stage 30 is uncoupled and the power stream is again routed to the variator 10.

What is claimed is:

1. A continuously variable transmission (CVT transmission) comprising:
   a start-up element,
   a variator, and
   a direct-shift stage for switching between a first operating range and a second operating range,
   wherein a maximum transmission ratio of the second operating range corresponds with a minimum transmission ratio of the first operating range, and
   wherein a closing valve is operatively connected to a variator fluid system so that the variator fluid system is closed fluid-tight by the closing valve when the direct-shift stage is in operation, with the variator uncoupled, for propulsion.

2. The CVT transmission according to claim 1, wherein a minimum variator transmission ratio of the second operating range is higher than a minimum variator transmission ratio of the first operating range.

3. The CVT transmission according to claim 1, wherein a claw clutch is included in the direct-shift stage as a normally open clutch.

4. The CVT transmission according to claim 1, wherein the direct-shift stage bridges the variator and is directly connected to an input drive.

5. The CVT transmission according to claim 1, wherein a sub-transmission is positioned between the variator and a differential.

6. A method for operating a continuously variable transmission (CVT transmission), comprising:
using a start-up element as a control element against drive train locking when switching to a direct-shift stage configured for switching between a first operating range and a second operating range,
wherein a closing valve is operatively connected to a variator fluid system so that a variator fluid system is closed fluid-tight by the closing valve when the direct-shift stage is in operation, with a variator uncoupled, for propulsion.

7. The method according to claim 6, wherein in a quick reset of a transmission ratio the system jumps directly from one operating range into the other operating range without using the direct-shift stage and without resetting completely steplessly.

8. The method according to claim 6, further comprising utilizing the start-up element in a slipping mode to accelerate the variator, which is initially stationary, before the direct-shift stage is uncoupled and before power is routed to the variator.

9. The method of claim 6, wherein a maximum transmission ratio of the second operating range corresponds with a minimum transmission ratio of the first operating range.

* * * * *